(12) United States Patent
Coppola et al.

(10) Patent No.: US 8,826,693 B2
(45) Date of Patent: Sep. 9, 2014

(54) APPARATUS AND METHOD FOR HEAT TREATING A GLASS SUBSTRATE

(75) Inventors: Frank T. Coppola, Horseheads, NY (US); Monica J. Mashewske, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 533 days.

(21) Appl. No.: 12/871,204

(22) Filed: Aug. 30, 2010

(65) Prior Publication Data
US 2012/0047954 A1 Mar. 1, 2012

(51) Int. Cl.
| | |
|---|---|
| *C03B 23/02* | (2006.01) |
| *C03B 29/02* | (2006.01) |
| *C03B 25/02* | (2006.01) |
| *C03B 35/20* | (2006.01) |
| *C03B 23/00* | (2006.01) |

(52) U.S. Cl.
CPC ............ *C03B 29/025* (2013.01); *C03B 25/025* (2013.01); *C03B 23/02* (2013.01); *C03B 35/205* (2013.01); *C03B 23/0093* (2013.01)
USPC ................................................ 65/36; 65/41

(58) Field of Classification Search
CPC .. C03B 35/205; C03B 35/207; C03B 25/087; C03B 29/10; C03B 29/025
USPC ........ 65/36, 41; 53/171.3, 172; 52/171.3, 172
See application file for complete search history.

(56) References Cited

U.S. PATENT DOCUMENTS

| | | | | |
|---|---|---|---|---|
| 2,389,360 A | * | 11/1945 | Guyer et al. ...................... | 65/40 |
| 2,521,048 A | * | 9/1950 | Day .................................. | 65/58 |
| 3,131,046 A | * | 4/1964 | Dennett et al. .................... | 65/58 |
| 3,507,737 A | * | 4/1970 | Busdiecker et al. .......... | 428/120 |
| 3,637,362 A | | 1/1972 | Oelke et al. ..................... | 65/25 A |
| 4,017,293 A | | 4/1977 | Illig ................................. | 65/107 |
| 4,287,990 A | | 9/1981 | Kurick .......................... | 206/448 |
| 4,311,239 A | | 1/1982 | Schlicker ...................... | 206/597 |
| 4,563,614 A | * | 1/1986 | Howorth ....................... | 313/524 |
| 4,591,374 A | | 5/1986 | Klemola ........................ | 65/350 |
| 4,632,688 A | | 12/1986 | Rahrig et al. ..................... | 65/29 |
| 4,634,329 A | | 1/1987 | Diederen et al. .............. | 414/159 |
| 4,643,532 A | * | 2/1987 | Kleiman ........................ | 349/190 |
| 4,815,601 A | | 3/1989 | Peterson et al. ............. | 206/454 |
| 4,824,464 A | | 4/1989 | Perin et al. ....................... | 65/106 |
| 4,930,634 A | | 6/1990 | Williams et al. ............... | 206/454 |
| 5,057,138 A | | 10/1991 | Vehmas et al. ................. | 65/111 |
| 5,597,395 A | | 1/1997 | Bocko et al. .................... | 65/33.4 |
| 5,605,229 A | | 2/1997 | Sowa ............................. | 206/454 |
| 5,641,076 A | | 6/1997 | Englund ..................... | 211/41.14 |
| 5,674,304 A | | 10/1997 | Fukada et al. ................. | 65/32.4 |
| 5,803,257 A | | 9/1998 | Bartholomew ............... | 206/454 |
| 5,813,536 A | | 9/1998 | Bartholomew ............... | 206/449 |
| 5,882,371 A | | 3/1999 | Miyazaki et al. .............. | 65/111 |
| 5,904,251 A | | 5/1999 | Ogata et al. ................... | 206/722 |
| 6,092,393 A | | 7/2000 | Mathivat et al. ............... | 65/106 |

(Continued)

*Primary Examiner* — John Hoffmann
(74) *Attorney, Agent, or Firm* — Kevin M. Able

(57) ABSTRACT

An apparatus and method for heat treating a plurality of glass substrates. The glass substrates are supported on support platform and housed in a heat treating furnace. The substrates are supported in a substantially vertical orientation by restraining pins extending through walls of the furnace, and are separated from each other by frame-shaped spacing members. The spacing members reduce convection currents between the substrates and reduce or eliminate the post-heat treating distortion of each glass substrate to less than 100 μm over the entire surface of the substrate.

15 Claims, 3 Drawing Sheets

(56) References Cited

U.S. PATENT DOCUMENTS

| | | | |
|---|---|---|---|
| 6,131,411 A | 10/2000 | Schnabel, Jr. | 65/111 |
| 6,374,640 B1 | 4/2002 | Fotheringham et al. | 65/111 |
| 6,458,440 B1 | 10/2002 | Merritt | 428/40.1 |
| 6,470,711 B1 | 10/2002 | Jarvinen et al. | 65/273 |
| 6,527,120 B2 | 3/2003 | Okamoto | 206/454 |
| 6,899,946 B2 | 5/2005 | Geary et al. | 428/319.3 |
| 7,059,473 B2 | 6/2006 | Watanabe et al. | 206/454 |
| 7,210,579 B2 | 5/2007 | Fujioka et al. | 206/451 |
| 7,363,777 B2 | 4/2008 | Davidson | 65/111 |
| 7,431,158 B2 | 10/2008 | Yamada et al. | 206/454 |
| 7,448,232 B2 | 11/2008 | Järvinen et al. | 65/348 |
| 7,508,482 B2 | 3/2009 | Son et al. | 349/187 |
| 7,604,121 B1 | 10/2009 | Tang et al. | 206/454 |
| 2003/0061834 A1 | 4/2003 | Vitkala et al. | 65/111 |
| 2003/0089132 A1 | 5/2003 | Kusuda | 65/29.18 |
| 2004/0083763 A1 | 5/2004 | Lambert | 65/119 |
| 2004/0237591 A1 | 12/2004 | Shetterly et al. | 65/111 |
| 2004/0261457 A1 | 12/2004 | Vehmas | 65/29.19 |
| 2005/0193772 A1 | 9/2005 | Davidson | 65/111 |
| 2007/0267312 A1 | 11/2007 | Coppola et al. | 206/454 |
| 2008/0164173 A1 | 7/2008 | Savakus | 206/454 |
| 2008/0185309 A1 | 8/2008 | Grigsby et al. | 206/454 |
| 2008/0276647 A1 | 11/2008 | Coppola et al. | 65/111 |

\* cited by examiner

APPARATUS AND METHOD FOR HEAT TREATING A GLASS SUBSTRATE

FIELD

This invention relates to a method and apparatus for heat treating a glass substrate, and more particularly to a method and apparatus for simultaneously compacting a plurality of glass substrates.

BACKGROUND

Liquid crystal displays (LCDs) are typically comprised of two flat glass substrates that encapsulate a thin layer of liquid crystal material. Arrays of transparent thin-film electrodes on one of the substrates modulate the light transmission properties of the liquid crystal material, thereby creating the image. By incorporating an active device such as a diode or thin film transistor (TFT) at each pixel, high contrast and response speed can be achieved to produce high-resolution displays. Such flat panel displays, commonly referred to as active matrix LCDs (AMLCD), have become the predominant technology for high performance displays such as computers and televisions.

The fabrication process for LCDs, and especially those used in the manufacture of poly-crystalline silicon (poly-Si) displays, typically consists of successive deposition and patterning of thin films using elevated temperature processes which result in substrate heating. Because of the high registration requirement between patterning steps for these thin films, the glass substrates often require dimensional stability (low shrinkage) in the 5-20 parts per million (ppm) range throughout the process. Five to twenty parts per million shrinkage means, for example, 2.5-10 microns shrinkage over a substrate length of 500 mm. When greater than 5-20 ppm shrinkage occurs, registration errors will accrue between components subsequently applied.

Poly-Si is conventionally made by depositing amorphous silicon (a-Si) onto a glass substrate using chemical vapor deposition (CVD) techniques, and subsequently exposing the coated glass to high temperatures for a sufficient period of time to crystallize the a-Si to poly-Si. This crystallization step is typically done at about 600° C. for several tens of hours. In addition, several other high temperature processes may follow the crystallization step. Such process steps include deposition and annealing of the gate oxide, and source/drain annealing.

The relatively high temperatures of the crystallization and subsequent processing steps encountered during poly-Si TFT manufacturing greatly increases the potential for glass substrate shrinkage.

Manufacturers of glass substrates (e.g., liquid crystal display, or "LCD", glass substrates) often heat treat the glass substrates to pre-shrink or compact the glass prior to shipping. Compacting glass substrates can be performed at various temperatures below the glass substrate strain point. Compaction or densification is performed to minimize dimensional changes of the glass during the customer's processing of the glass substrate. If the glass substrates are not pre-shrunk, the substrates can undergo contour changes that may negatively affect the finished display quality. Compaction must be performed without creating glass chips that can contaminate the glass surfaces, or distorting the glass substrate surfaces through spatially non-uniform heating and/or cooling patterns.

Conventionally, a closed cassette has been used to support glass substrates during heat treatment. An open cassette is also utilized in some applications. In a closed cassette support method, multiple glass substrates are held in a vertical orientation within enclosed sections of a cassette. The glass substrates are supported with horizontal and vertical supports (such as those made of stainless steel). In practice, the glass substrates are supported around their perimeters to maintain surface quality and prevent warp. The glass substrates are typically captured along the full length of all four edges.

In an open cassette support method, multiple glass sheets are held in a vertical orientation within a cassette. The glass sheet is supported at its edges with vertical and horizontal supports. As in the closed cassette support method, the glass substrate is supported around the perimeter to maintain its physical attributes. Both the open and closed cassette methods generally minimize the gravity effect on the glass during heat treatment.

In both the closed and open cassette support designs, the glass substrates are contacted along substantially all of at least three edges. This contact often causes substrate damage or loss. The full-contact supports also have an impact on the thermal characteristics of the system. As may be appreciated, the metal mass of the supports concentrated along each substrate edge impacts the temperature profile at the edges due to the heat having to travel through metal before reaching the glass along the edges and corners. Additionally, in both support designs, debris (including glass particles and chips) builds up in the bottom-edge support and is difficult to clean out; as a result, these support designs can cause significant debris contamination of glass substrates. Moreover, the large differences in coefficient of thermal expansion between the metal supports and the glass substrates result in a large movement of the substrates relative to the supports and potential damage to the substrates.

Both of the aforementioned support designs are manufactured by bending and forming sheet material (such as stainless steel) into the required assembly. By nature, these procedures are not precise, difficult to produce, and costly to manufacture.

SUMMARY

In accordance with one embodiment, a method of heat treating a plurality of glass substrates in a furnace is disclosed comprising positioning at least one spacing member between pairs of adjacent glass substrates of the plurality of glass substrates, the at least one spacing member comprising a closed outer frame portion bounding an open interior, and wherein a difference between a CTE of the one or more spacing members and a CTE of the plurality of glass substrates is less than $10 \times 10^{-7}/°$ C. In some embodiments, the glass substrates may have a dimension such that a major surface of each glass substrate of the plurality of glass substrates has a surface area of at least 5 m$^2$.

Adjacent glass substrates and the at least one spacing member form an enclosed space bounded by the adjacent glass substrates and the at least one spacing member.

The plurality of glass substrates are supported in a substantially vertical orientation wherein the plurality of glass substrates and the one or more spacing members positioned between adjacent glass substrates are biased together in a contacting relationship with a biasing force and heated in the furnace. After the heating process, the glass substrates are allowed to cool. An out-of-plane distortion of the plurality of glass substrates after cooling does not exceed 100 μm.

A plurality of spacing members may be employed between adjacent glass substrates, arranged in a vertical and/or horizontal array. Preferably, adjacent spacing members positioned between the same pair of adjacent glass substrates contact each other at outside non-quality edge portions of each adjacent spacing member.

The plurality of glass substrates are preferably heated to a temperature greater than an annealing point of the plurality of glass substrates and less than a softening temperature of the plurality of glass substrates. In some embodiments, depending on glass composition, the plurality of glass substrates is heated to a temperature greater than 700° C.

The at least one spacing member may be composed of glass. Preferably a composition of the glass of the at least one spacing member is the same glass composition as a glass composition of the plurality of glass substrates.

In some embodiments, the furnace comprises an outer enclosure wall and an inner enclosure wall and a first side and a second side. A first plurality of restraining pins extend through the inner enclosure wall and the outer enclosure wall on the first side of the furnace, the first plurality of restraining pins being rigidly mounted to a support structure. A second plurality of restraining pins extend through the inner enclosure wall and the outer enclosure wall on the second side of the furnace, wherein each restraining pin of the second set of restraining pins movable along a longitudinal axis of the restraining pin. The bias force is applied against the plurality of glass substrates with the second plurality of restraining pins. In another embodiment, an apparatus for heat treating a plurality of glass substrates is described comprising a furnace comprising an outer enclosure wall, an inner enclosure wall, a first side and a second side, a first plurality of restraining pins extending through the outer enclosure wall and the inner enclosure wall on the first side of the furnace into an interior volume defined by the furnace, the first plurality of restraining pins being constrained such that movement of the pins relative to the inner enclosure wall is prevented. A second plurality of restraining pins extends through the outer enclosure wall and the inner enclosure wall on the second side of the furnace and each restraining pin of the second plurality of restraining pins is movable along a longitudinal axis of the restraining pin. The second plurality of restraining pins comprises biasing assemblies to apply a bias force against the plurality of glass substrates. The biasing assembly may comprise, for example, pneumatic cylinders and/or springs. A position sensor may be coupled to each restraining pin of the second plurality of restraining pins. The position sensor relays information about the position of the restraining pin to a computer in electrical communication with each biasing assembly of the second plurality of restraining pins. The computer controls the position of the restraining pins individually, based on the received position information.

To accommodate expansion and contraction of the inner wall, for example during heat up and cool down, the inner furnace wall may be corrugated.

Each restraining pin of the first plurality of restraining pins comprises a contact member that contacts a glass substrate of the plurality of glass substrates and an extension member coupled to the biasing assembly, and wherein a joint movably connects the contact member and the extension member.

Similarly, each restraining pin of the second plurality of restraining pins may also comprise a contact member that contacts a glass substrate of the plurality of glass substrates and an extension member coupled to the biasing assembly, and wherein a joint movably connects the contact member and the extension member. In some instances, movement of the second set of restraining pins is controlled such that contact between the second plurality of restraining pins and an outermost glass substrate of the plurality of glass substrates is coplanar during the heating process.

The apparatus may include one or more guide members extending into the furnace that support the plurality of glass substrates in a vertical orientation, wherein a glass substrate of the plurality of glass substrates makes sliding contact with the one or more guide members while the plurality of glass substrates are moved from a position outside the furnace to a position inside the furnace.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

Figures 1, 2:
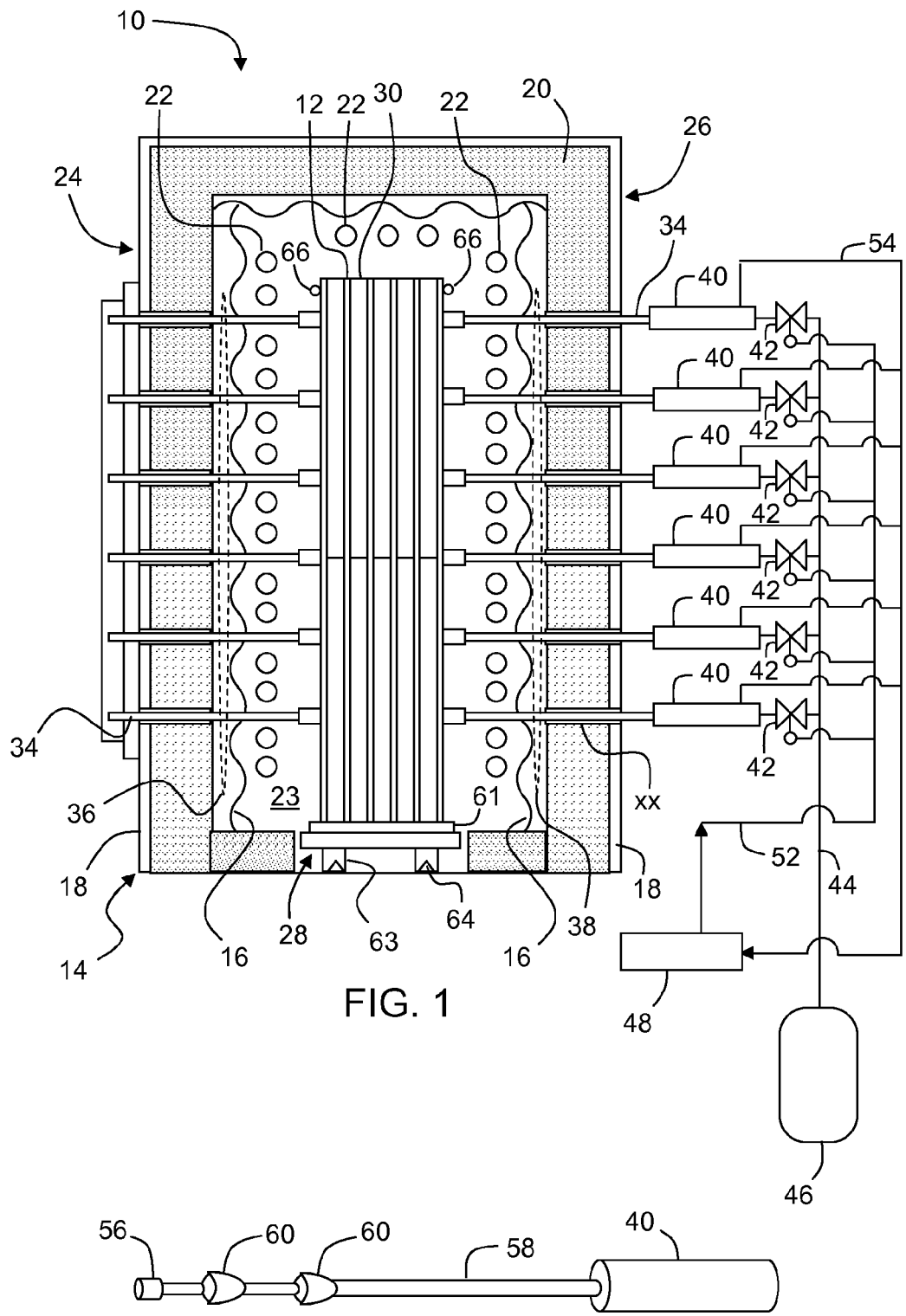
FIG. 1 is a cross sectional end view of an apparatus for compacting a plurality of glass substrates in a vertical orientation.
FIG. 2 is a side view of an articulated restraining pin.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Shown in FIG. 1 is a perspective view of an apparatus 10 for simultaneously heat treating a plurality of vertically oriented glass substrates 12 in a compaction process. Apparatus 10 comprises furnace 14 including inner furnace wall 16 and outer furnace wall 18, the inner and outer furnace walls being separated by insulating material 20. Heating elements 22 are positioned within interior volume 23 defined by furnace 14, and are generally arranged adjacent to inner furnace wall 16. Furnace 14 further includes a first side 24 and a second side 26, which, when the plurality of glass substrates are loaded into the furnace, are generally parallel to the glass substrates. The first and second sides are comprised of portions of the inner and outer furnace walls. When furnace 14 is in operation, a plurality of glass substrates 12 are arranged vertically on a movable cart 28 within interior volume 13 and separated from each other by spacing members 30. These and other components of apparatus 10 will be described in more detail below.

Referring still to FIG. 1, inner furnace wall 16 may be constructed to accommodate thermal expansion of the inner wall. For example, the inner furnace wall shown in FIG. 1 is formed from a metal selected to minimize corrosion (e.g. stainless steel or Inconel®), and is corrugated to accommodate thermal expansion of the wall.

Heating elements 22 are disposed within interior volume 23 and arranged to flank, or be adjacent to, the outer-most glass substrates of the plurality of glass substrates arranged on cart 28. Heating elements 22 can be, for example, electrical resistance heaters. In some embodiments, multiple individually controlled heating elements can be employed along each side of the assembled glass substrates so the heating elements can be used to produce a differential temperature profile across the plurality of glass substrates if needed. That is, so that the temperature radiated against a surface of an outermost glass substrate can be varied across that surface if desired. Additional heating elements 22 may also be arranged in an upper portion of furnace 14 and at an end of furnace 14 to ensure the edge portions of the glass substrates are also heated.

Also shown in FIG. 1 are pluralities of restraining pins 34 that extend from outside the furnace to inside the furnace through outer furnace wall 18 and inner furnace wall 16 along the first and second sides of the furnace. Restraining pins 34 are positioned to contact the outermost glass substrates of the plurality of glass substrates and stabilize the vertically standing substrates. In some embodiments, a first plurality or set 36 of restraining pins extend through first side 24 of the furnace (e.g. through the outer and inner enclosure walls), are configured to contact an outer-most glass substrate of the plurality of glass substrates, and are rigidly fixed so that there is no movement of each restraining pin along a corresponding longitudinal axis of the restraining pin. For example, first restraining pin set 36 can be rigidly coupled to the furnace as shown in FIG. 1. Alternatively, first restraining pin set 36 can be coupled to a support structure outside and separated from the furnace.

A second plurality or set 38 of restraining pins on opposite, second side 26 of the furnace are configured to contact the other outermost glass substrate and are biased against the other outermost glass substrate by biasing assemblies 40 when the plurality of glass substrates are positioned within the furnace. Biasing assemblies 40 can comprise springs and/or pistons (e.g. pneumatically or hydraulically-operated pistons) coupled to the individual restraining pins of second restraining pin set 38. As shown in FIG. 1, biasing assemblies 40 may be connected through individual pneumatic control valves 42 and gas supply lines 44 to pressurized gas source 46 and may be individually controlled by a computer 48 through control lines 52. Position information from individual biasing assemblies may be collected by position sensors (not shown) comprising the biasing assemblies, and communicated to computer 48 through data lines 54. The biasing assemblies may also include force sensors, i.e. load cells (not shown) that provide information to the computer about the force applied to the glass substrates by the individual restraining pins. Computer 48 utilizes the position and/or force information from each position and/or force sensor to maintain each restraining pin in registration such that the distal ends of each pin (i.e. the contact surfaces of each restraining pin that contact the glass substrates) are coplanar and apply sufficient force to ensuring the glass substrates are held flat.

Restraining pins 34 may further include jointed distal contact members that contact the outer-most glass substrates. During temperature changes in the heat treating furnace (e.g. heat up and cool down), the glass substrates may expand or contract a sufficient amount that relative motion between un-jointed restraining pins and the outermost glass substrates occurs, leading to potential damage to the glass substrates. Consequently, as shown in FIG. 2, each restraining pin 34 may include an end portion, or contact foot 56, that is coupled to an extension member 58 via one or more joints 60 such as ball joints. This articulated (jointed) construction allows the contact foot portion of the restraining pin to move relative to the extension member portion, such as during expansion and contraction of the plurality of glass substrates.

As may be appreciated, contact between the restraining pins and the glass substrates has the potential for damaging the two, outer-most glass substrates of the plurality of assembled substrates. This can be avoided by arranging the restraining pins so that each restraining pin contact foot contacts the outermost glass substrates only in areas of the substrate that will not later be used in a device—so-called non-quality areas. However, as the restraining pins are generally not easily repositionable along each side of the furnace, an arrangement of restraining pins that works for one glass substrate size will likely not accommodate another size. An alternative approach is to employ sacrificial glass substrates as the outer-most glass substrates. Thus, surface damage resulting from contact between the restraining pins and the sacrificial glass substrates will not affect the interior glass substrates positioned between the sacrificial glass substrates. The sacrificial glass substrates can be cleaned and re-used, or discarded.

Figure 3:
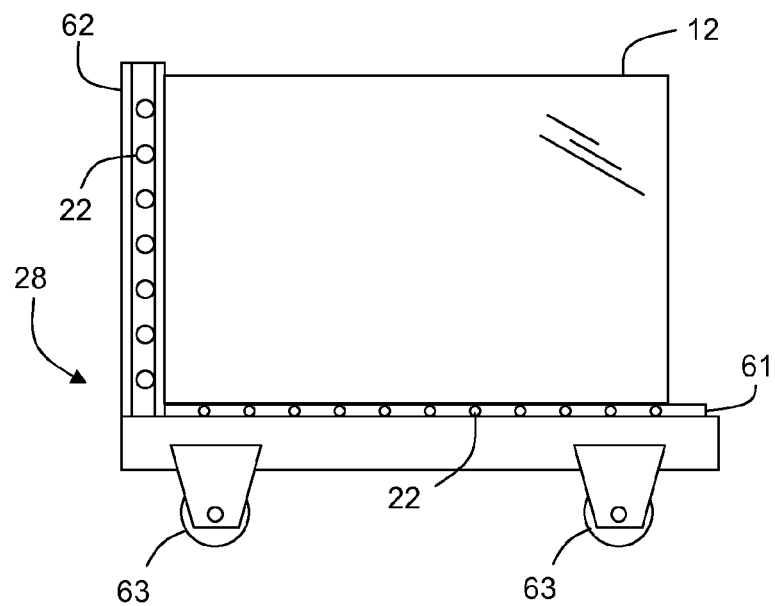
FIG. 3 is a side elevated view of a cart for supporting and transporting a plurality of glass substrates in an upright (i.e. vertical) orientation.

The plurality of glass substrates are assembled on top of cart 28. The cart also may serve as the bottom of the furnace. Cart 28 preferably comprises an insulated top portion 61 upon which the glass substrates rest. The insulated portion of the cart can be encased in alloy steel for example. The cart supports the weight of the glass substrates, and is movable between a position outside the furnace to a position inside the furnace to transport the glass substrates into and out of the furnace. The cart can include heating elements 22 located on or in the top portion of the cart and under the glass substrates to heat the bottom of the glass substrates and improve temperature uniformity. An upright support member 62 is positioned at one end of the cart (FIG. 3), and can be used to support the glass substrates on the cart as the substrates are loaded. For example, the car can be tilted backward so that edges of the glass substrates are supported by support member 62 during the loading. Support member 62 can form a closure for the furnace (e.g. door) when the cart is positioned within the furnace. That is, support member 62 can form a wall of the furnace. Support 62 may also include heating elements 22. Thus, a combination of heating elements 22, either forming a part of the furnace or cart 28, and positioned along the edges of the glass substrates when the substrates are positioned within furnace 14, ensure even heating of the glass substrates and reduced stresses.

Preferably, cart 28 comprises wheels 63 for facilitating transport of the glass substrates into and out of the heat treating furnace. For example, the wheels may be configured to ride on one or more rails 64. In some embodiments, wheels may be included on one side of the cart, while legs are provided on the other side. The legs facilitate tilting of the platform, which can be advantageous when loading the platform with glass substrates.

In addition, at least one guide member 66 extends from a location outside the furnace into the furnace, such that, as cart 28 is moved into the furnace, the plurality of glass substrates are contacted and supported by the at least one guide member as the platform traverses the distance into the furnace. For example, in certain embodiments, the guide member is a cable that extends into the furnace along cart rail 64. As cart 28 is moved into furnace 14 with the plurality of glass substrates positioned atop the cart, at least one glass substrate of the plurality of glass substrates contacts guide member 66, preventing the plurality of glass substrates from leaning away from a vertical orientation. In certain other embodiments, multiple guide members can be used, for example, two guide cables, one arranged on each side of the plurality of glass substrates to prevent leaning to either side of the glass substrates. Preferably, the contacted glass substrates are sacrificial glass substrates.

Figure 4:
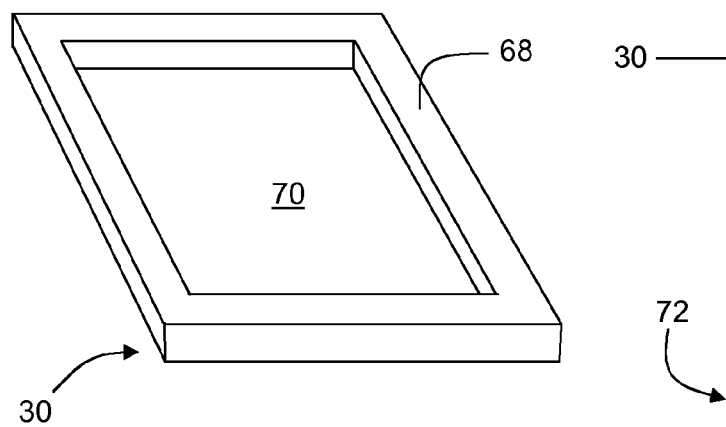
FIG. 4 is a perspective view of a spacing member used to separate adjacent glass substrates.

Shown in FIG. 4 is a perspective view of a single spacing member 30. As illustrated, spacing member 30 comprises an outer wall portion 68 that is a closed loop shaped like a picture frame, and thus has an open interior 70 circumscribed by the spacing member outer wall portion. Each spacing member should be constructed of a material having a coefficient of thermal expansion (CTE) that substantially matches the CTE of the glass substrates to minimize relative motion between the spacing members and the glass substrates during heat up and cool down cycles. The CTE difference between the spacing members and the glass substrates should not exceed $10 \times 10^{-7}/°$ C. For example, the spacing member may be formed from the same glass that forms the glass substrate. That is, the spacing member and the glass substrates preferably have the same glass composition. The spacing member can alternatively be made from a glass ceramic material as long as the CTE difference between glass ceramic material and the glass of the glass substrates does not exceed $10 \times 10^{-7}/°$ C.

The spacing members can be formed, for example, by casting. A single slab of glass can be cast, ground and polished to ensure the surfaces of the spacing member will be flat and parallel, and a center portion of each slab cut away, such as by water jet cutting. Alternatively, a slab or plate can be formed by other processes (e.g. drawing), after which cutting, grinding and polishing can be performed.

Figure 5:
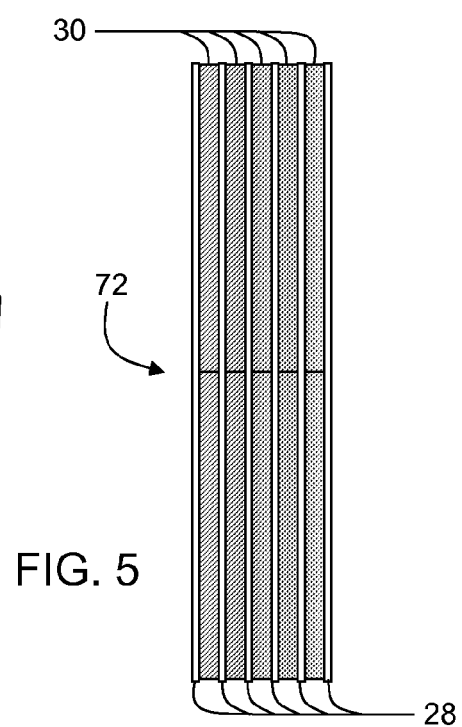
FIG. 5 is a cross sectional view of a stack of glass substrates seen from the edges of the substrates, wherein the substrates are separated by spacing members.

In accordance with embodiments of the present invention, at least one spacing member 30 is positioned between adjacent glass substrates of the plurality of glass substrates to form a stack 72 consisting of alternating glass substrates and spacing members (FIG. 5).

Figure 6:
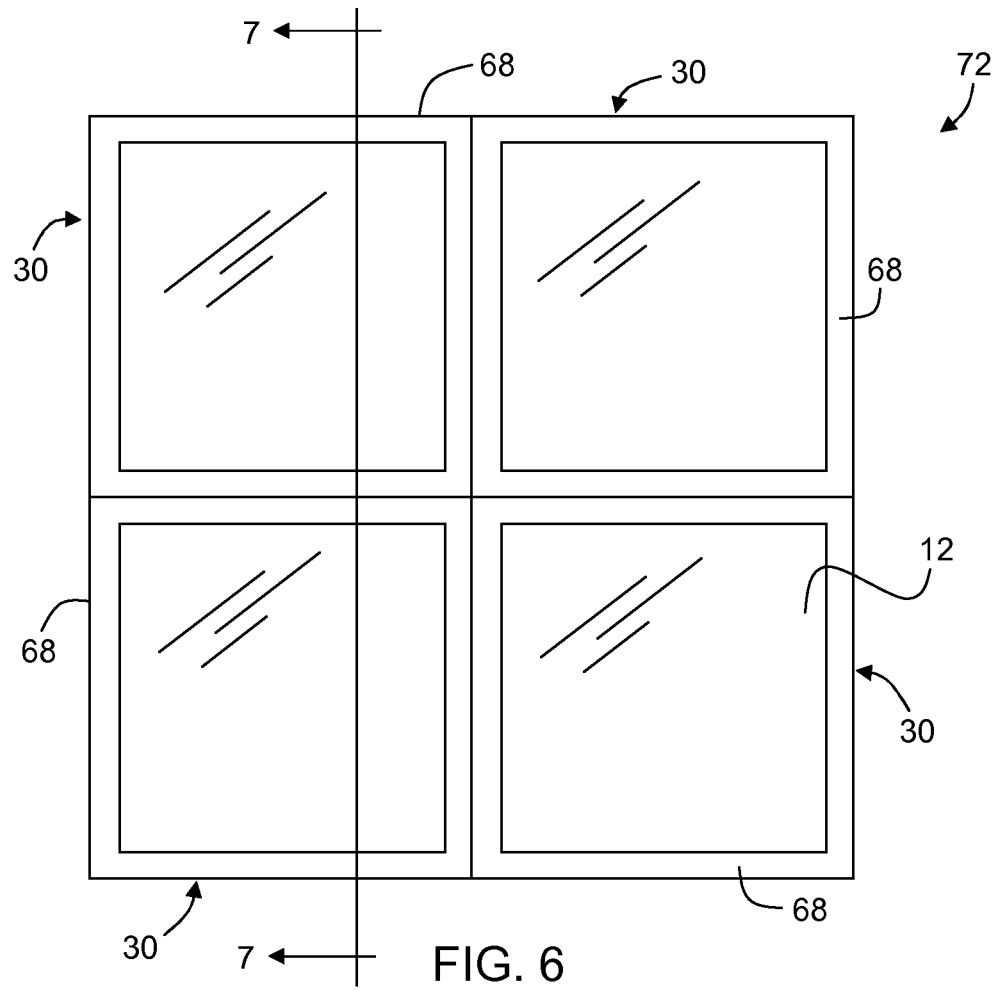
FIG. 6 is a side elevational view of the stack of glass substrates of FIG. 5 showing the spacing members.

For large glass substrates (or small sized spacing members), such as glass substrates having a one-side surface area equal to or greater than 5 $m^2$, a plurality of spacing members 30 may be deployed between adjacent glass substrates of the plurality of glass substrates, with the spacing members arranged in a horizontal and vertical arrays such as illustrated in FIG. 6. For example, four spacing members 30 can be arranged in a 2×2 array arranged edge-to-edge. Preferably, the plurality of spacing members is positioned with at least some of their outer edges in contact to minimize the creation of unusable (contacted) glass surface area. The number of spacing members positioned between adjacent glass substrates, and the dimensions of the array, depend on the size and shape of the glass substrates to be separated.

Figure 7:
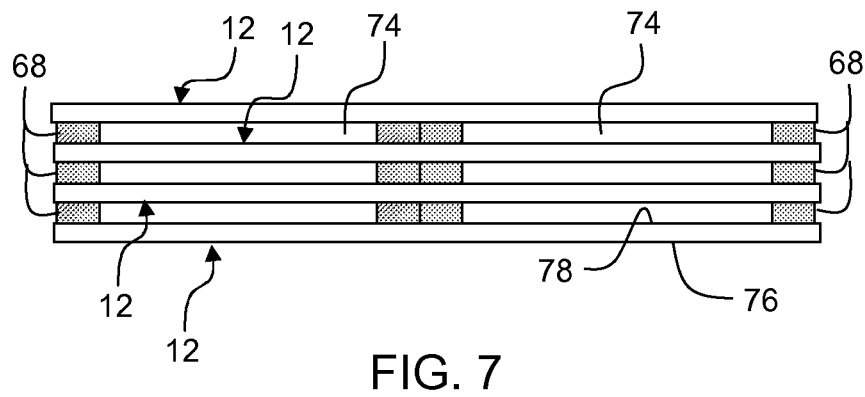
FIG. 7 is a cross sectional edge view of the stack of glass substrates of FIG. 5 showing compartments between the glass substrates formed by the spacing members.

With one or more spacing members 30 positioned between adjacent glass substrates 12, narrow pockets or compartments 74 are created between adjacent glass substrates 12, each glass substrate having first and second parallel major surfaces 76 and 78. FIG. 7 depicts a cross sectional edge view of the stack of glass substrates and spacing members of FIG. 6, and shows a plurality of compartments 74 located between and in contact with adjacent major surfaces of adjacent glass substrates of the stack. This compartmentalization between adjacent glass substrates minimizes gas flow between the glass substrates, and thereby temperature differentials on the glass substrate that can produce stress are also minimized. For example, a plurality of glass substrates can be arranged such that four spacing members are disposed between each adjacent pair of glass substrates. If there are eight square glass substrates each having a dimension of 2 meters by 2 meters (2 m×2 m), 7 sets of spacing members are employed, one set between each pair of adjacent glass substrates, and each set consisting of four one-meter square spacing members arranged in a contacting relationship in a 2×2 array. Because the spacing members have frame shaped walls, there is no contact with the glass substrates within the central open area of the frame-shaped spacing members. When the spacing members are sandwiched between adjacent glass substrates, four compartments are created between each pair of adjacent glass substrates, each compartment bounded by the glass substrates and the walls of the spacing members. The walls of the spacing members prevent gas flow between compartments and effectively prevent significant convection currents to move over the glass surface that might otherwise create unwanted temperature differentials in the glass.

Because in certain industries, such as the LCD display industry, contact with the glass substrates creates areas of the substrate that are no longer useable (e.g. due to potential contact damage), it is preferably that contact between the spacing members occurs only in the non-quality regions of the glass substrate. For example, glass substrates are typically supplied to equipment manufacturers (e.g. those making the display units) in large master glass substrates that are later sectioned into a plurality of smaller substrates. Cutting the master substrate to size is usually performed by the equipment manufacturer. Prior knowledge by the glass manufacturer of the number of sections to be created from an original master by the equipment manufacturer allows arrangement of the spacing members during the heat treating according to the intended cut pattern. Continuing with the previous example of a 2 m×2 m glass substrate, if it is known the original, master glass substrate is to be divided into 4 equal-sized segments of 1 square meter, the "seams" between four 1 meter spacing members arranged in a 2×2 array between adjacent glass substrates—the line where each spacing member contacts an adjacent spacing member—coincides with the cut line that separates the glass substrate into separate sections. Thus, the plurality of spacing members forms a grid of glass walls disposed between adjacent glass substrates. If the width of the wall forming each spacing member is minimized, the amount of surface area on each of the resultant separate substrate sections contacted by any given spacing member is minimized. For example, if the wall of each spacing member is 1 cm wide, the perimeter area of each cut or sectioned substrate contacted by a spacing member is only 1 cm, even though the combined wall width of two adjacent spacing members is 2 cm in this example.

Alternatively, to reduce the contact area of the spacing members against the glass substrates still further, those portions of the spacing member wall that contact other spacing members can be made thinner than the portions of the spacing member that do not contact other spacing members. Using the example above, if the sides of rectangular spacing member that contact other spacing members are made to have a width of only 0.5 cm rather than the 1 cm described above, the combined width of adjacent walls of adjacent spacing members is only 1 cm rather than the 2 cm previously obtained. Thus, one or more spacing members may be used wherein a width of the wall of the spacing member varies. That is, one side wall of the spacing member can have one width and another side wall of the spacing member can have a different width.

In some embodiments, the plurality of glass substrates may be divided into two stacks, each stack comprising a plurality of glass substrates. Furnace 14 may then include an additional set of heating elements 22 that is centrally and vertically disposed in the furnace such that the centrally disposed heating elements are positioned between the first and second assemblies of glass substrates when the glass substrates are positioned within the furnace by cart 28.

The process of heat treating the plurality of glass substrates can proceed as follows. In a first step, a first glass substrate is loaded onto cart 28. To facilitate loading, the cart can be tilted to one side, and may further be raised at one end so that the glass substrates are supported simultaneously by top portion 61 and support member 62 of cart 28. The first loaded glass substrate becomes one of the outer-most glass substrates, and because it will be contacted by a set of restraining pins, a sacrificial glass substrate may be used.

Next, at least one spacing member is positioned adjacent to the first glass substrate. If the glass substrate is large enough, a plurality of spacing members can be positioned adjacent to the first glass substrate. Then, one the one or more spacing members are appropriately arranged, a second glass substrate is positioned adjacent to the previously deployed spacing members, and another set of one or more spacing members are positioned adjacent to the second glass substrate. This process, positioning alternating layers of glass substrates and one or more spacing members, continues until the desired number of glass substrates are assembled into the stack. The last loaded glass substrate becomes the other, opposite outermost glass substrate, and may also be a sacrificial glass substrate.

When the final glass substrate has been positioned, cart 28 with assembled stack 72 of glass substrates can be righted, and the stack of glass substrates clamped at the edges thereof, such as by U-clamps. Cart 28 is then moved into furnace 14, with the stack of glass substrates in contact with the at least one guide member 66.

In the furnace, one side of the stacked assembly 72 of glass substrates is contacted by the first set 36 of the fixed restraining pins extending through a first wall of the furnace, while the second set 38 of movable restraining pins are biased against the opposite side of the stacked assembly of glass substrates, effectively clamping the assembly of glass substrates between the two groups of restraining pins in a substantially vertical orientation. Stacked assembly 72 is preferably maintained within 10 degrees of vertical, within 5 degrees of vertical, within 3 degrees of vertical and preferably within 1 degree of vertical as heat is applied during the heat treating process. The furnace heats the stacked glass substrates to an appropriate heat treating temperature for an appropriate amount of time. Because the combined weight of the substantially vertically oriented stacked assembly 72 bears downward against cart 28 during the heat treating there is less likelihood that out of plane distortion of the glass substrates can occur. By out of plane distortion what is meant is a gravity-free shape change in a glass substrate that extends out of the plane represented by a surface of a given glass substrate. That is, in the absence of gravity, the opposing major surfaces of a glass substrate should be substantially planar (i.e. having a deviation from planar no more than 100 µm over an entire major surface of the substrate), and maintain this planarity after the heat treating. More simply put, out of plane distortion results in a glass substrate that is not flat.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of heat treating a plurality of glass substrates in a furnace comprising:
    positioning at least one spacing member between pairs of adjacent glass substrates of the plurality of glass substrates, the at least one spacing member comprising a closed outer frame portion bounding an open interior, and wherein a difference between a CTE of the one or more spacing members and a CTE of the plurality of glass substrates is less than $10 \times 10^{-7}/°C$.;
    supporting the plurality of glass substrates on a support platform in the furnace in a substantially vertical orientation, the supporting comprising:
        contacting a first outermost most glass substrate of the plurality of glass substrates with a first plurality of restraining pins, each restraining pin of the first plurality of restraining pins being rigidly fixed;
        contacting a second outermost glass substrate of the plurality of glass substrates with a second plurality of restraining pins, wherein each restraining pin of the second plurality of restraining pins being movable along a longitudinal axis thereof, and wherein each restraining pin of the second plurality of restraining pins applies a force to the second outermost glass substrate;
    heating the plurality of glass substrates in the furnace;
    cooling the plurality of glass substrates; and
    wherein an out-of-plane distortion of the plurality of glass substrates after cooling does not exceed 100 µm.

2. The method according to claim 1, wherein the at least one spacing member comprises a plurality of spacing members arranged in a vertical and/or horizontal array between each pair of adjacent glass substrates.

3. The method according to claim 2, wherein adjacent spacing members of the plurality of spacing members contact each other at outside edge portions of each adjacent spacing member.

4. The method according to claim 1, wherein during the heating step the plurality of glass substrates are heated to a temperature greater than an annealing point of the plurality of glass substrates and less than a softening temperature of the plurality of glass substrates.

5. The method according to claim 1, wherein during the heating step the plurality of glass substrates are heated to a temperature greater than 700° C.

6. The method according to claim 1, wherein the at least one spacing member is a glass or a glass ceramic material.

7. The method according to claim 6, wherein the at least one spacing member is glass and the glass of the spacing member is the same glass composition as a glass composition of the plurality of glass substrates.

8. The method according to claim 1, wherein the adjacent glass substrates and the at least one spacing member positioned therebetween form an enclosed space bounded by the adjacent glass substrates and the at least one spacing member.

9. The method according to claim 1, wherein a major surface of each glass substrate of the plurality of glass substrates has a surface area of at least 5 m$^2$.

10. The method according to claim 1, wherein the first plurality of restraining pins extend through a first side of the furnace.

11. The method according to claim 1, wherein the force is applied by a spring or a pneumatic piston.

12. The method according to claim 1, wherein the spacing member is a single piece of glass.

13. The method according to claim 1, further comprising contacting a glass substrate of the plurality of glass substrates with at least one guide member.

14. The method according to claim 1, wherein the guide member is a cable.

15. The method according to claim 1, further comprising maintaining each pin of the second plurality such that distal ends of each pin are in contact with the second outermost glass substrates and are coplanar.

* * * * *